June 1, 1971  N. I. LONDON ET AL  3,581,402
AUTOMATIC THICKNESS GAUGING APPARATUS
Filed March 26, 1969  2 Sheets-Sheet 1
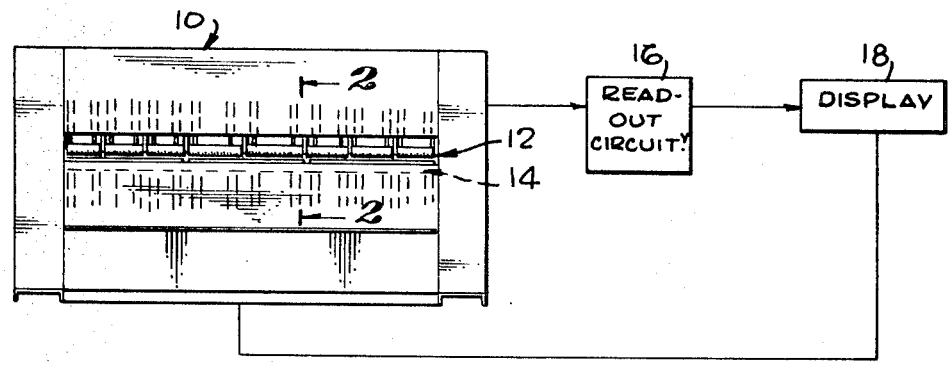
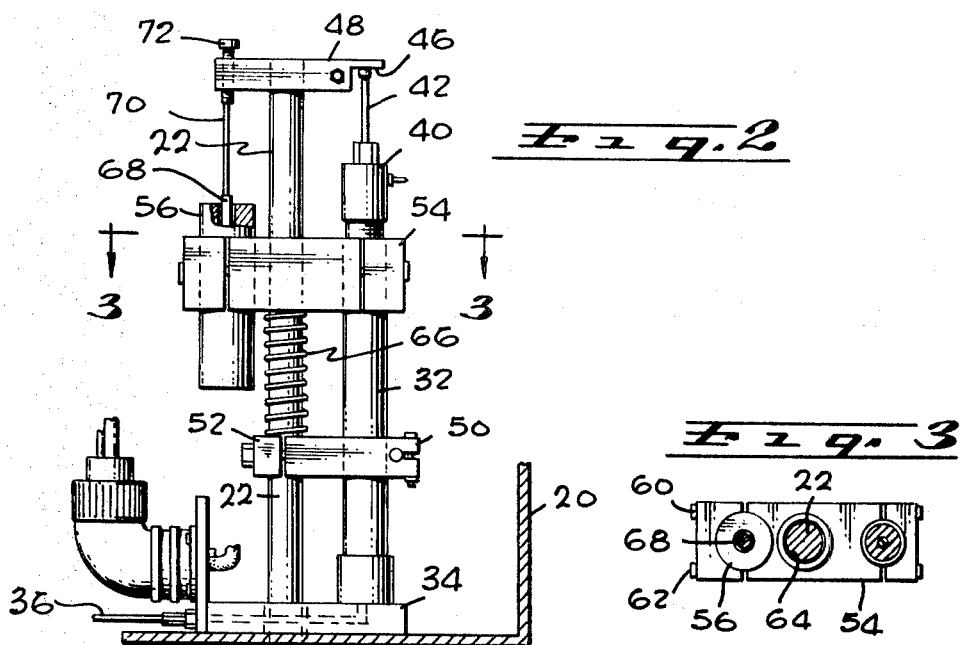
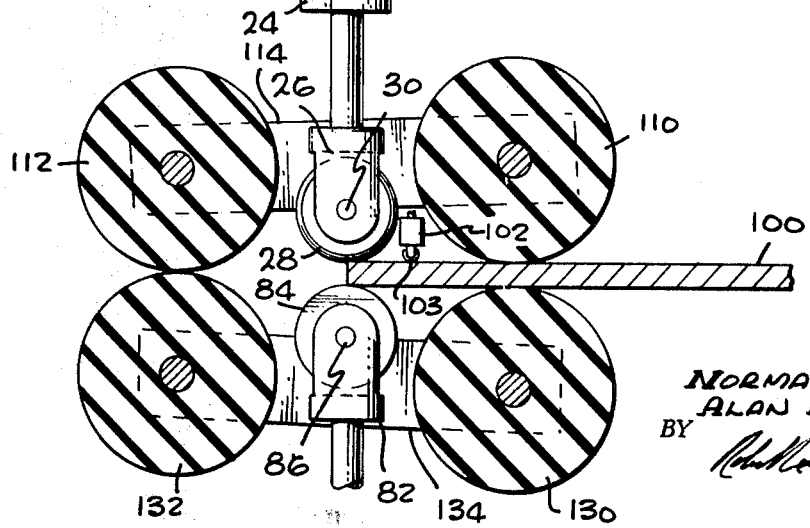
INVENTORS
NORMAN I. LONDON
ALAN R. DAVIS
BY
ATTORNEY

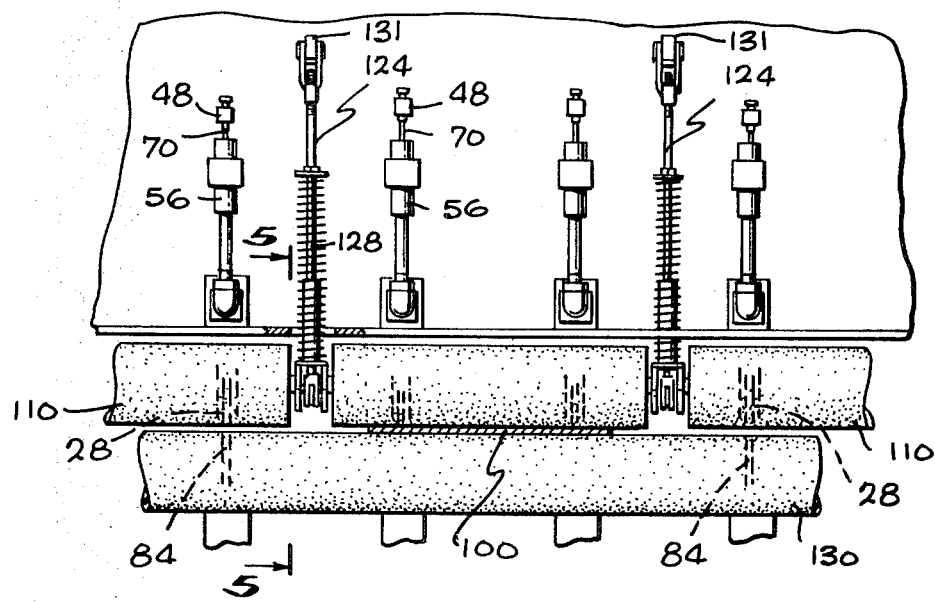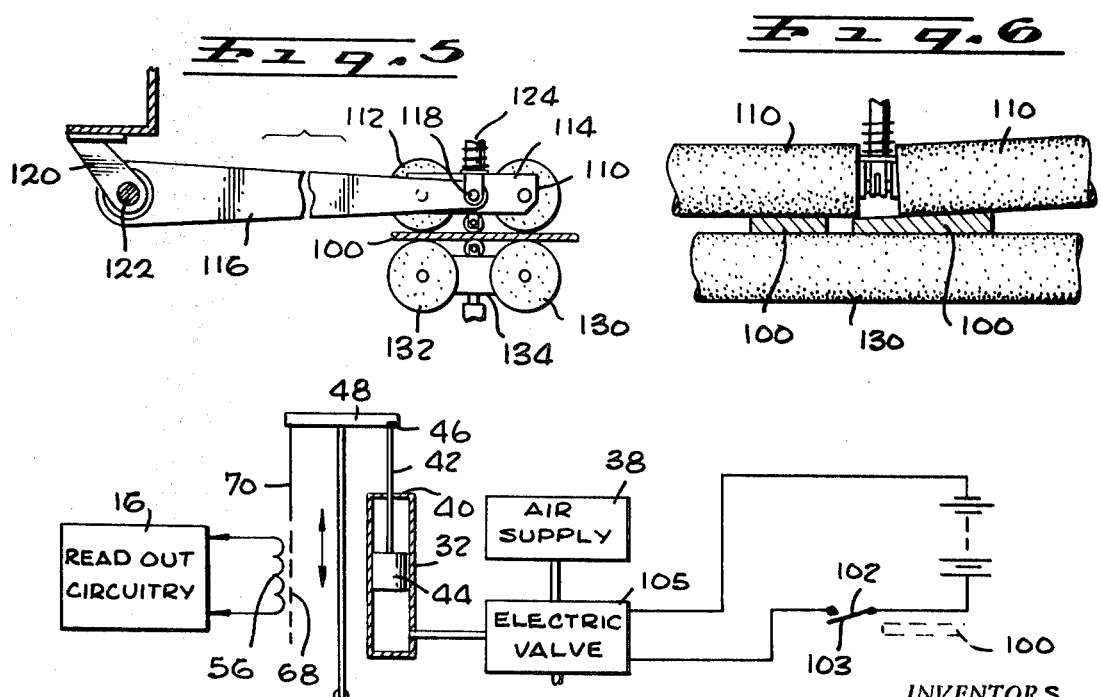

United States Patent Office 3,581,402
Patented June 1, 1971

3,581,402
AUTOMATIC THICKNESS GAUGING APPARATUS
Norman I. London, 13524 Lull St., Van Nuys, Calif. 91402, and Alan R. Davis, 3103 S. Coolidge Ave., Los Angeles, Calif. 90066
Filed Mar. 26, 1969, Ser. No. 810,559
Int. Cl. A61b 5/10
U.S. Cl. 33—174                                   8 Claims

ABSTRACT OF THE DISCLOSURE

Apparatus for gauging the thickness of a plurality of sheets or strips of material of varying cross-sections comprising springloaded articulated powered rollers continuously advancing the sheets or strips along a path; a plurality of spaced thickness gauges having a retractable follower, urged into contact with the surface of the moving sheets or strips; retractors adapted to withdraw the followers from the path of the moving sheets or strips; limit switches actuated by the passage of the trailing edge of each sheet or strip to activate said retractors, and by the passage of the leading edge of the following sheet or strip to deactivate said retractors; and braking means controlling the rate of movement of the followers.

BACKGROUND OF THE INVENTION

Field of the invention

This invention relates to automatic thickness gauging apparatus and more particularly to an improved gauging apparatus which automatically retracts the gauge follower from the path of continuously advancing sheets or strips of material and returns it, under control, into contact with the surface of each sheet or strip.

Prior art

In the prior art, gauging devices employing probes, rollers, guide followers, or the like, which bear upon the surface of a sheet or strip of moving material for measuring the thickness thereof are well known. In some instances, a single gauging probe or follower is used which bears upon the surface of the advancing material and measures the thickness between the probe or follower and a stationary anvil. In other prior art devices, paired probes or followers bear upon opposite sides of the moving sheet for accurately measuring the thickness and/or contours thereof. In some of these devices, a set of rollers drive and guide the sheets of material into contact with the gauging means.

A significant problem encountered with these prior art automatic gauging devices is that when each moving piece of material is first introduced into the gauging means, its leading edge strikes the gauging probe or roller with considerable force. In some cases this causes the probe or roller to skip or chatter, thereby giving inaccurate measurements. Often either the material or the probe or roller is marred. Repeated over an extended period of use, these blows actually lead to the breakdown of the gauge itself.

Similarly, when the piece passes from under the gauge, the probe or roller drops abruptly, often against the anvil which supports the material, or, where similar gauging means are positioned below the material, against the other probe or roller. In either case, inaccurate measurements and hastened wear and permanent damage of the delicate measuring equipment result.

It is a primary object of this invention, accordingly, to provide an improved gauging device which senses the leading and trailing edges of the material passing through it and automatically and controllably brings the gauging head into contact with the surface of the material precisely as the leading edge passes into gauging position, and automatically retracts the gauging head with the passage of the trailing edge.

Another object is to provide such an apparatus capable of continuously measuring the thickness of a piece of material at preselected stations along its width. Still another object is to provide an apparatus of this type which is capable of accommodating strips or sheets of material of varying thicknesses, cross-sectional shapes, and widths.

Yet another object is the provision in such a device of means for continuously feeding such strips or sheets into the gauging apparatus and continuously displaying and recording the thickness measurements.

Other objects will become apparent from a reading of the following description of several embodiments of the subject invention as illustrated in the accompanying drawings in which:

DESCRIPTION OF THE DRAWINGS

FIG. 1 is a to plan view illustrating the principles of this invention and used in showing the readout and display apparatus in block diagram;

FIG. 2 is a sectional view taken along the lines 2—2 of FIG. 1, partially illustrating the retracting mechanism of the present invention;

FIG. 3 is a sectional view taken along the lines 3—3 of FIG. 2, which illustrates the clamping block used to hold the solenoid and retraction cylinder used in the present invention;

FIG. 4 is a partial view of a preferred embodiment of the invention showing the position and operation of a plurality of thickness gauges and the rollers which accommodate materials of varying thicknesses and cross-sections;

FIG. 5 is a sectional view taken along the lines 5—5 of FIG. 4, illustrating the pivotal mounting apparatus used for adjusting the guide rollers to accommodate pieces having different thicknesses and cross-sections;

FIG. 6 is a partial view illustrating the articulated flexible movement of the rollers; and FIG. 7 is a schematic diagram illustrating the principles of the present invention and its operation.

Wherever practicable, like numerals are used throughout the description to indicate the same or corresponding parts in the several figures.

DETAILED DESCRIPTION OF THE INVENTION

There is shown in FIG. 1 the automatic gauging apparatus 10 which measures the thickness of sheets or strips of material 100 advanced thereunder by a pair of guide means 12 and 14. Guide means 12 and 14 are springloaded and articulated to accommodate strips or sheets of material over a wide range of thicknesses and cross-sectional shapes. Readout circuitry 16 receives input data from the gauging device 10 and applies it to display means 18 which may be in the form of a typewriter readout, graphic display, or any of the other well known readout devices.

FIG. 2 illustrates an example of a preferred form of the gauging devices of this invention. As shown, these devices are mounted in opposed pairs comprising an upper and a lower unit to avoid needless duplication, only a portion of the lower unit is shown. Referring to the upper unit shown in FIG. 2, a fixed plate 20 is affixed to the chassis of the gauging device 10. A follower arm 22 is slidably mounted by a guide bearing 24 which is firmly attached to plate 20 in a suitable manner. A yoke 26 is coupled to the bottom end of the follower arm 22 and has a gauging wheel 28 rotatably connected to the yoke 26 by an axle 30.

An air cylinder 32 is coupled to an air feed block 34 which in turn is securely mounted on plate 20. Block 34 has a passageway therein which is coupled to an air line 36 which receives air from an air supply 38, as shown in FIG.

7. A piston 44 is positioned to reciprocate within cylinder 32.

The air cylinder 32 has an end cap 40 with an opening therein for a push rod 42 to extend therethrough. The push rod 42 is coupled to the piston 44 within cylinder 32 as shown in FIG. 4. The push rod 42 bears upon a notch 46 cut in a yoke 48. Yoke 48 has one end affixed to the cam follower rod 22 in a suitable manner. When the piston 44 is actuated by air being fed into the cylinder 32 from the air line 36, the cam follower rod 22 is moved in an upward direction.

A shaft guide 50 is firmly mounted to the follower arm 22 and slidably mounted to the cylinder 32 by the bolt clamping arrangement 52 to prevent any rotation of the follower arm 22. A second clamp 54 firmly binds the cylinder 32 to a transformer core 56, but allows the arm 22 to reciprocate freely through a hole 64 therein. Clamp 54 is secured by means of bolts 60 and 62, as shown in FIG. 3. A spring 66 is positioned on the shaft and forces the clamps 50 and 54 apart. This, in effect, springloads the arm 22 so that when the air pressure in cylinder 32 is relieved, the follower arm 22 is urged downwardly.

By adjusting the tension of spring 66, the friction exerted on shaft 22 by bearing 24, and the rate of discharge of air from cylinder 32, the descent of arm 22 may be controlled so that roller 28 comes in contact with the upper surface of sheet 100 as close to the leading edge of the sheet as desired. In addition, these adjustment insure that roller 28 will not strike the moving sheet with excessive force.

The transformer 56 has a core 68 therein which is connected by a shaft 70 to the yoke 48. This connection may be made by the bolt 72 being connected to the shaft 70 in a suitable manner, and threaded into the yoke 48. When the core 68 moves in and out of the transformer 36, the inductance in the core is sensed by the readout circuitry 16, a shown in FIG. 1, whereby a change in inductance in the core 56 is directly proportional to the longitudinal movement of arm 22. Since the position of mounting plate 20 with respect to the chassis of the apparatus is known precisely, the movement of arm 22 can readily be converted into equally precise measurements of the thickness and contour of the moving sheet. Readout adjustments and calibrations may be made by adjusting the bolt 72 into the yoke 48. This changes the position of the core 68 within transformer 56.

The lower pneumatically operated gauging device, substantially identical with the device just described, is positioned directly beneath the upper unit. In it a shaft 80 is coupled to a yoke 82 which has a wheel 84 mounted for rotation on an axle 86. The output from the transformer of this lower unit, which reflects the longitudinal motion of the shaft 80 is likewise reflected by the readout circuitry 16.

While this preferred embodiment employs pairs of opposed gauging units to measure the thickness and contour of both surfaces of a sheet of material, it should be understood that a flat surface such as an anvil, or the like, may be used in place of the lower unit without departing from the spirit and scope of the subject invention.

To advance a sheet or strip of material 100 between the gauging wheels 28 and 84, two sets of rollers, positioned at convenient intervals across the width of the chassis, are employed. The first set serve as guide rollers, and are shown in FIGS. 4 and 5 as a plurality of pairs 110 and 112. These guide rollers 110 and 112 are articulated in springloaded pairs straddling the upper gauging units. Each of the pairs of guide rollers 110 and 112 is rotatably mounted on support members 114 which, in turn, are pivotably mounted at their mid-points to the end of arms 116 by means of axles 118. Arms 116 are pivotally attached to support arms 120 by means of axles 122. The support arms 120 are securely affixed to the chassis of the gauging device 10.

Other arms 124 extend perpendicular to the support axles 118, which are journalled through their lower ends. The other ends of arms 124 are pivotably connected through spring mechanisms 128 to stationary pivot points 131. The spring mechanisms 128 force the guide rollers 110 and 112 downwardly against the upper surface of the sheet of material 100. Means may be provided at the top of the shafts 124 to effectively lift the entire bank of guide rollers 110 and 112 upwardly, if desired. With this arrangement, guide rollers 110 and 112 are adapted to accommodate at once a number of sheets of strips of varying widths, thicknesses, and contours, as shown in FIG. 6.

The second set of rollers comprise a plurality of paired drive rollers 130 and 132 conveniently spaced across the chassis below guide rollers 110 and 112. Drive rollers 130 and 132 are rotatably connected to supports 134, as shown in FIG. 5. Conventional means (not shown) are provided to drive the lower rollers 130 and 132 which, in cooperation with guide rollers 110 and 112, advance the material 100 through gauging apparatus 10. Preferably the drive rollers 130 and 132 are either made of, or are covered with, rubber or a similar resilient material having a high coefficient of friction.

It will be apparent that if desired, the driving means may be connected to the upper rollers 110 and 112, which then become the drive rollers, and the lower rollers 130 and 132 allowed to rotate freely as guide rollers.

In operation, a sheet or strip of material 100, which is to be gauged, is passed between the guide and drive rollers 110 and 130, with the upper and lower gauging units maintained in their retracted positions by air pressure retained in cylinders 32 from the last cycle of the preceding use of the apparatus. In order to detect the leading and trailing edges of the advancing sheet or strip of material 100, a microswitch 102 is provided. The actuation cam 103 of switch 102 is positioned in the path of the advancing sheet 100. When switch 102 is actuated, the air supply to cylinders 32 is cut off by an electric valve 105 which simultaneodsly bleeds the pressure within the cylinders 32. The upper and lower gauging units, acting under the influence of springs 66, advance gauging wheels 28 and 84 into contact with the upper and lower surfaces of sheet 100. As mentioned above, the rate of advance is regulated to bring wheels 28 and 84 into such contact just as the leading edge passes between them.

As the trailing edge of the sheet 100 passes under cam 103 the switch 102 actuates the electric valve 105, which in turn supplies air from the air supply 38 into the cylinders 32 of the upper and lower gauging units, forcing the pistons 44 therein upwardly and downwardly, respectively. The followers 22 and 80 and wheels 28 and 84 are thus retracted out of the path of the next piece of material to be gauged, and the apparatus is ready to repeat the gauging cycle.

If desired, conventional switch means (not shown) may be employed to actuate valve 105 when the apparatus is initially turned on, thereby introducing air under pressure into cylinders 32 and retracting wheels 28 and 84 from the path of the first piece of material started through rollers 110 and 130.

Having thus described one preferred embodiment of this invention, what is claimed is:

1. Apparatus for automatically gauging the thickness of a plurality of pieces of material in the form of sheets or strips comprising:

powered means advancing said pieces along a path;

gauging means, including a follower adapted for movement substantially normal to said path and urged toward said path, said gauging means being responsive to the thickness of said pieces;

retracting means associated with said gauging means retracting said follower out of said path;

resilient means associated with said gauging means opposing said retracting means and urging said follower into said path;

control means cooperating with said resilient means to time the return of said follower to said path to coincide with the arrival of said leading edge, and to restrain the impact of said follower with the surface of said piece; and switch means associated with said gauging means sensing the passage of the leading edge and the trailing edge of each of said pieces, and activating said retracting means upon the passage of said trailing edge and deactivating said retracting means upon the passage of said leading edge.

2. The apparatus defined in claim 1 wherein:

said gauging means includes, in addition, an inductance coil having a movable core effectively connected to, and reciprocated therein by said follower, said coil providing an electrical output signal corresponding with the movement of said follower.

3. The apparatus defined in claim 2 wherein said retracting means comprises:

a source of fluid under pressure;

a cylinder containing a piston adapted to reciprocate therein and operatively connected to said follower; and valve means effectively connecting said cylinder with said fluid source and actuated by said switch means.

4. The apparatus defined in claim 3 in which said powered means include:

a pair of rollers positioned on opposite sides of said path and adapted to receive said pieces therebetween;

resilient means urging one of said rollers toward the other of said rollers and into frictional contact with said pieces; and driving means effectively driving one of said rollers to move said pieces along said path.

5. The apparatus defined in claim 3 in which said powered means comprise:

a first set of spaced rollers positioned on on side of said path and rotatably mounted at their adjacent ends to rigid, elongated supporting members, each of said supporting members being supported at, and adapted to pivot about a central transverse axis;

a second set of spaced rollers positioned on the opposite side of said path and registering with said first set of rollers;

resilient means urging said first set of rollers toward said second set of rollers and into frictional contact with said pieces when they pass between said first and second sets of rollers; and driving means effectively driving one of said sets of rollers to move said pieces along said path.

6. The apparatus defined in claim 5 wherein:

the rollers of said first and second sets of rollers, respectively, are positioned on opposite sides of said follower; and each of said supporting members is mounted at its said pivotal axis to support means adapted for movement substantially normal to said path.

7. The apparatus defined in claim 6 wherein:

each of said supporting means is free to move independently of the others of them.

8. The apparatus defined in claim 3 wherein said control means comprises:

pressure relief means actuated by said switch means upon the passage of said leading edge controllably relieving the fluid pressure within said cylinder.

References Cited

UNITED STATES PATENTS 2,794,258   6/1957   Danielsson     33—147L

FOREIGN PATENTS 878,443   10/1942   France     33—148A

WILLIAM D. MARTIN, JR., Primary Examiner

U.S. Cl. X.R.

33—147; 209—88